United States Patent

[11] 3,585,287

[72] Inventor Howard F. Jirka
Riverside, Ill.
[21] Appl. No. 850,568
[22] Filed Aug. 15, 1969
[45] Patented June 15, 1971
[73] Assignee Zenith Radio Corporation
Chicago, Ill.

[54] CHROMINANCE SIGNAL TAKEOFF NETWORK
4 Claims, 3 Drawing Figs.

[52] U.S. Cl. .......... 178/5.4
[51] Int. Cl. .......... H04n 9/53
[50] Field of Search .......... 178/5.4; 333/28 T; 179/1.2

[56] References Cited
UNITED STATES PATENTS
2,989,501 6/1961 Keizer et al. .......... 178/5.4
3,471,636 10/1969 Palladino .......... 178/5.4

*Primary Examiner*—Richard Murray
*Assistant Examiner*—John C. Martin
*Attorney*—Francis W. Crotty

ABSTRACT: The chroma takeoff network, coupling the picture detector to the chrominance channel of a color receiver, comprises a first capacitor and an inductor connected in series across the output of the video detector and further comprises a second capacitor and a variable resistor connected in series across the inductor. The circuit values are proportioned so that the subcarrier component of the chrominance signal has essentially constant amplitude for all adjustments of the variable resistor.

Inventor
Howard F. Jirka
By Francis W. Crotty
Attorney

CHROMINANCE SIGNAL TAKEOFF NETWORK

BACKGROUND OF THE INVENTION

The present invention is directed to a network that selects the chrominance signal in a color receiver, separating it from the luminance signal and delivering it to a chrominance channel for processing. For convenience, it may be referred to as a chroma takeoff.

It is well understood that the frequency response characteristic of a color television receiver, as observed at the picture detector is shaped in a particular manner in order to obtain a desired relative response to luminance information on the one hand and the other necessary information of the color broadcast on the other hand to favor translation of luminance information up to this point in the receiver. For example, the response characteristic is shaped to effect selective attenuation of both the modulated subcarrier component which bears color information and the modulated sound carrier which conveys the audio information of a given program. By suppressing response to these carriers and favoring frequency components which predominantly represent luminance information, there is obtained a desired freedom from crosstalk or interference that otherwise impairs image reproduction. At the same time, however, this presents the need to exalt or favor in some fashion the chrominance subcarrier component either prior to its delivery to the chrominance channel or in its translation through that channel to facilitate processing the chrominance signal as required to derive the hue and saturation data of the image being translated. It has been the practice in the past to use an adjustable tuned circuit that is resonant near the subcarrier frequency of the chrominance signal to shape the frequency response of the chroma channel in an effort to compensate the response of the receiver which selectively attenuated the chrominance signal as described above. While this approach has been successful, it does not have all of the flexibility desired, and, more importantly, it tends adversely to change the intensity of the subcarrier component with tuning adjustments resorted to in order to shape the response characteristic to the chrominance signal. Of course, adjustability of the chroma passband is a necessary characteristic to accommodate the fact that the frequency response of a color receiver prior to the chroma takeoff is of itself subject to variation.

Accordingly, it is an object of the invention to provide an improved chrominance signal takeoff network for a color television receiver.

It is a specific object of the invention to provide a takeoff network of the type under consideration which is adjustable selectively, but yet is characterized by the fact that the subcarrier component has essentially constant amplitude for all conditions of adjustment.

It is still a further object of the invention to provide such a takeoff network which also delivers the chroma signal with modulation components that are amplitude balanced, that is to say, the amplitude-frequency characteristic is symmetrical with respect to the frequency of the subcarrier component.

SUMMARY OF THE INVENTION

A carrier takeoff network, constructed in accordance with the invention, is especially suited for coupling the chrominance channel of a television receiver to a source, such as the picture detector, which in response to a color television program develops luminance and chrominance signals. That source has a frequency response characteristic which has a substantially constant maximum value over a first frequency range representing luminance information and slopes essentially linearly to a minimum value over a second frequency range contiguous to and extending beyond the first range and representing chrominance information. The network comprises a first capacitor and an inductor connected in series across the source. A second capacitor and an adjustable resistor are connected in series across the inductor. The parameters of the network are proportioned to provide a frequency response over the second range which, for one particular adjustment of the resistor, slopes from a minimum toward the aforesaid maximum value to compensate the slope in the response characteristic of the source to develop the chrominance signal across the inductor with the subcarrier component of a predetermined intensity and with amplitude-balanced modulation components and which, for any other adjustment of the resistor, develops the chrominance signal across the inductor with a subcarrier component of essentially the same predetermined intensity.

BRIEF DESCRIPTION OF THE DRAWING

The features of the present invention which are believed to be novel are set forth with particularity in the appended claims. The invention, together with further objects and advantages thereof, may best be understood by reference to the following description taken in connection with the accompanying drawing, in the several figures of which like reference numerals identify like elements, and in which:

DESCRIPTION OF THE PREFERRED EMBODIMENT

Figure 1:
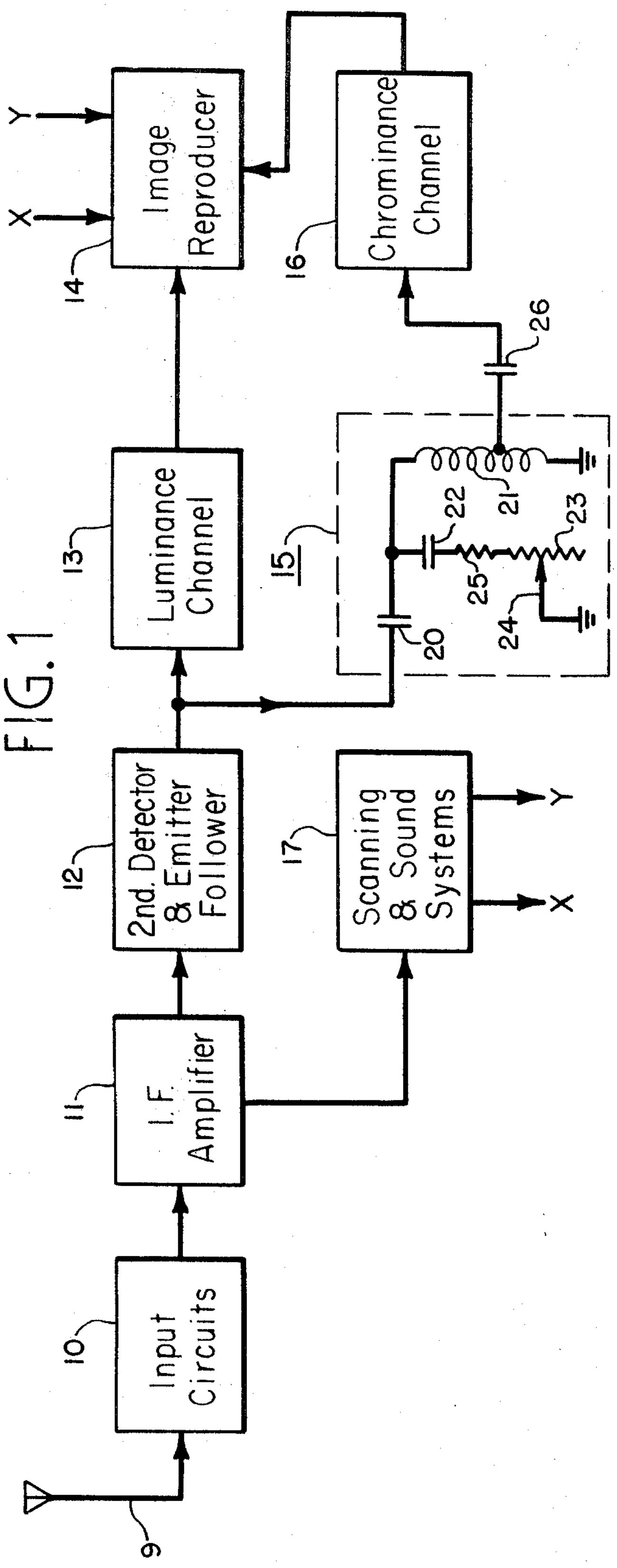
FIG. 1 is a schematic representation in block form of a color television receiver including a chrominance takeoff network embodying the invention.

Aside from the specifics of the chroma takeoff network, the color receiver represented in FIG. 1 is conventional in structure and operation so that it will be described only briefly. The receiver has the usual tunable input circuits 10 to which is coupled an antenna 9 and this portion of the receiver is to be understood to include tunable radiofrequency selectors, a tunable heterodyning oscillator and the first detector which are adjusted by customer controls to select a desired color television program which is converted to the intermediate frequency of the receiver. The intermediate frequency signal after amplification in an intermediate frequency amplifier 11 is detected in the second or picture detector 12. Frequently, the output of the picture detector is an emitter follower which, as indicated by the legend, will be assumed to constitute a part of detector 12. The emitter resistor or load of the emitter follower may, for convenience of claim terminology, be likened to a source which, in response to a received color television program, develops the luminance and chrominance signals required for image reproduction. The luminance signal is delivered to a luminance channel 13 where it is amplified and then applied to an image reproducer 14. The chrominance signal is taken off by means of a takeoff network 15, to be described more particularly hereinafter, coupling a chrominance channel 16 to the emitter follower of detector 12. The chrominance signal is processed in channel 16 as required to derive and apply to image reproducer 14 color control signals. The arrangement represented contemplates internal matrixing, that is to say, the luminance signal and color-difference signals are applied to input electrodes of the image reproducer which is usually a three-gun shadow mask cathode-ray tube wherein these components are matrixed in order to control the three beams as required to synthesize an image in simulated natural color as those beams are caused to scan an image screen in a repeating series of spaced parallel lines. Deflection of the electron beams over the image area is controlled by the usual scanning systems represented, along with the sound system, by unit 17 to which the IF signal is delivered from amplifier 11. Connections of the line and field portions of the scanning system extend to the image reproducer as designated by connection points X and Y. The sound portion of unit 17 responds to the sound signal of the color program so that the audio is reproduced along with the image information.

There, of course, are other necessary portions of the receiver such as dynamic convergence, power supply and the like, which have not been specifically illustrated nor described since they constitute no part of the present invention, and of themselves, are well understood both as to design and operation. More particular attention will now be directed to the chrominance signal takeoff network 15.

This network comprises a first capacitor 20 and an inductor 21 connected in series across the emitter load of the emitter follower included in unit 12. A second capacitor 22 and an adjustable resistor 23 are connected in series across inductor 21. As shown, resistor 23 has, as extreme values, essentially zero resistance on the one hand and a maximum resistance on the other depending on the position of its tap 24. Another resistor 25 is preferably connected in series with capacitor 22 and adjustable resistor 23 to establish a predetermined minimum resistance of the branch of the network that these three components constitute. A coupling capacitor 26 provides means for deriving the chrominance signal from inductor 21 and for applying it to chrominance channel 16.

Figure 2:
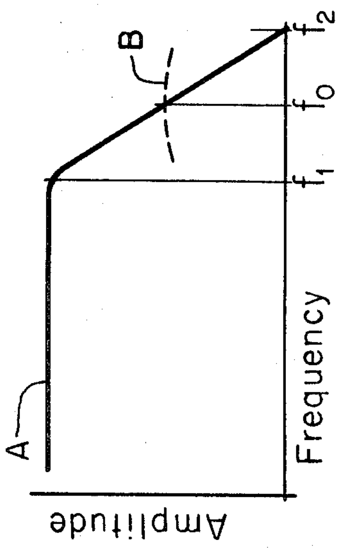
FIGS. 2 and 3 include characteristic curves utilized in explaining operating properties of the receiver of FIG. 1.

The takeoff network is, of course, frequency selective and its parameters are proportioned to provide a frequency response related to that of signal source 12 as required to favor the chrominance signal which it takes off and applies to channel 16. The correlation of the frequency characteristics of network 15 to those of source 12 will be more clearly understood from a consideration of the curves in FIGS. 2 and 3. The full line curve A of FIG. 2 is a familiar representation of the frequency response of the receiver through the output of second detector 12 to a received color television program. It will be observed that the response has a substantially constant maximum value over a first frequency range extending up to the frequency $f_1$ and representing essentially luminance information. At that point, and in order to attenuate the chrominance signal for purposes of minimizing crosstalk, the response slopes approximately linearly to a minimum value over a second frequency range contiguous to and extending beyond the first range and representing chrominance information. The second range has as its llmits the frequencies $f_1$ and $f_2$. The chrominance signal is a subcarrier component of frequency $f_0$ which is essentially centered within range $f_1$—$f_2$. This component has associated with it double sideband modulation components which, although symmetrical in the frequency spectrum with respect to the subcarrier are unbalanced as to amplitude because of the slope of the response characteristic A. It is most desirable that takeoff network 15 have the effect of modifying the frequency response of the receiver in the range $f_1$—$f_2$ to that of broken line curve B wherein it is represented that the double sideband modulation components of the chrominance signal are also symmetrical as to amplitude or are amplitude balanced as distinguished from the unbalance designated by the sloping portion of full line curve A. This desirable result is attained by proportioning the parameters of takeoff network 15.

Figure 3:
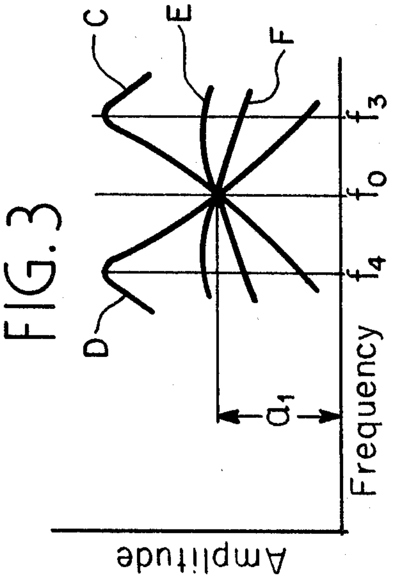

If components 22—25 of this network be neglected momentarily, which is equivalent to adjustment of resistor 23 to an infinite value, it will be appreciated that capacitor 20 and inductor 21 form a series resonant circuit which has a high Q and its response would be that of curve C of FIG. 3. It peaks at a frequency $f_3$ which is a little higher than the high frequency limit of the passband of the chrominance signal. The passband of that signal extends essentially from 3.1 to 4.1 MHz. and frequency $f_3$ may have a value of about 4.2 MHz. If the frequency response of the series resonant circuit is that of curve C, the subcarrier component of the chrominance signal as applied to channel 16 will have a predetermined amplitude $a_1$ determined by the location of the tapping point to inductor 21. Over the frequency range $f_4$ to $f_3$, which includes the chrominance passband, the response slopes from a minimum to a maximum value and preferably compensates the slope designated by curve A over frequency range $f_1$—$f_2$. For those conditions, the effective frequency response to the chrominance channel is that of broken line curve B of FIG. 2. Of course, as a practical matter resistor 23 has no setting for which it represents an infinite impedance but its maximum impedance adjustment is sufficiently high that curve C is a fair representation of the circuit conditions in the face of such an adjustment.

As thus far discussed, ideal conditions have been considered and the parameters of network 15 may be proportioned to give essentially complete compensation for the effect of the tilted portion of curve A with respect to the components of the chrominance signal. As a consequence, the chroma takeoff network rejects most of the frequency components representing luminance information, especially the relatively low frequency ones that contain most of the video signal energy, and applies the chrominance signal with amplitude-balanced modulation components to channel 16. Obviously, such conditions are not always encountered and it is, therefore, desirable to have the network adjustable which is accomplished, as stated, by including adjustable resistor 23. If the effect of series resistor 25 be excluded momentarily, an alternate extreme condition of adjustment may be established, namely, one in which tape 24 is advanced to its topmost position at which resistor 23 is effectively shorted out of the circuit reducing the resistive component to zero. Under these circumstances, capacitors 20 and 22 establish a different, lower resonant frequency and the response of the network is modified from that of curve C to that of curve D in FIG. 3, peaking at frequency $f_4$. This, too, is a condition of high Q. Intermediate positions are made available both by including resistor 25 which establishes a preselected minimum effective resistance in network arm 22—25 and by the adjustable tap of variable resistor 23. The response for other conditions of adjustment are shown, for example, by representative curves E and F. It will be observed that all of these curves pass through a common point, indicating that for all conditions of adjustment of resistor 23, the chrominance signal developed across inductor 21 has a subcarrier component of substantially the same predetermined intensity. To achieve that result a particular proportioning of the parameters of the network is necessary.

If $V_1$ is the signal potential applied to the input of network 15 from 12 and $V_2$ is the potential across the entirety of inductor 21, the ratio of these potentials is as follows:

$$\frac{V_2}{V_1}=\frac{\dfrac{jX_2(R+jX_3)}{R+j(X_2+X_3)}}{jX_1+\dfrac{jX_2(R+jX_3)}{R+j(X_2+X_3)}} \qquad (1)$$

where $R$ is the resistance in series with capacitor 22, $X_1$ is the reactance of capacitor 20, $X_2$ is the reactance of inductor 21, and $X_3$ is the reactance of capacitor 22 at the subcarrier frequency. It can be shown that the ratio of the amplitudes of potentials $V_2$ and $V_1$ is independent of $R$ if the following condition is satisfied:

$$X_3=-\tfrac{1}{2}\cdot\frac{X_1X_2}{X_1+X_2} \qquad (2)$$

Accordingly, if takeoff network 15 is proportioned in this manner, it supplies the chrominance signal to channel 16 with a constant amplitude of its subcarrier component for all conditions of adjustment and it is conveniently adjustable to meet the requirements of the receiver in which it may be installed. Series resistor 25 is employed simply because the condition of curve D would hardly be desirable; it would tend to exaggerate rather than compensate for the tilt of curve A over the chroma passband.

In one embodiment of the invention that has been successfully used, unit 15 was comprised of the following:

resistor 23—a variable 25,000 ohm component
resistor 25—1,000 ohms
capacitor 20—47 pF
capacitor 22—47 pF
inductor 21—27.5 $\mu$H The impedance of network 25 is high enough not to adversely load the emitter follower of detector 12 and, at the same time, is low enough so that it, in turn, is not adversely loaded by chrominance channel 16.

The described arrangement is an attractive takeoff network for the chrominance signal since it features adjustable sideband selectivity and yet essentially constant intensity of the chroma subcarrier component. It is especially attractive as a coupling network to interconnect picture detector 12 with the chrominance amplifier that normally forms the initial stages of channel 16. A microcircuit form of such an amplifier is the subject of applicant's copending application, Ser. No. 837,022, filed June 27, 1969, and assigned to the assignee of the present invention. That amplifier is a monolithic structure and the takeoff network of this application is eminently suited as a coupling network for supplying the chrominance amplifier with the chrominance signal obtained at the picture detector.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A takeoff network for coupling the chrominance channel of a television receiver to a source which, in response to a color television program, develops luminance and chrominance signals and which has a frequency response characteristic that has a substantially constant maximum value over a first frequency range representing luminance information and slopes essentially linearly to a minimum value over a second frequency range contiguous to and extending beyond said first range and representing chrominance information comprised of a modulated subcarrier component with double sideband modulation components, said network comprising:

a first capacitor and an inductor connected in series across said source;

a second capacitor and a resistor, adjustable between maximum and minimum values, connected in series across said inductor, the parameters of said network being proportioned to provide a frequency response for said network over said second range which, for one particular adjustment of said resistor, slopes from a minimum to said maximum value to compensate said slope in said response characteristic of said source to develop said chrominance signal across said inductor with a subcarrier component of a predetermined intensity and with amplitude-balanced modulation components and which, for any other adjustment of said resistor, develops said chrominance signal across said inductor with a subcarrier component of substantially the same predetermined intensity;

and means for deriving said chrominance signal from said inductor and for applying it to said chrominance channel.

2. A chrominance-signal takeoff network in accordance with claim 1 in which the reactive impedance satisfies the following relation:

$$X_3 = -\tfrac{1}{2} \cdot \frac{X_1 X_2}{X_1 + X_2},$$

where $X_1$ is the reactance of said first capacitor, $X_2$ is the reactance of said inductor, and $X_3$ is the reactance of said second capacitor at the frequency of said subcarrier component.

3. A chrominance-signal takeoff network in accordance with claim 2 in which said resistor is adjustable between the values of zero and infinity and in which a fixed resistor is connected in series with said adjustable resistor and said second capacitor to determine the minimum effective resistance of said adjustable resistor.

4. A chrominance-signal takeoff network in accordance with claim 3 in which said one particular adjustment of said resistor is that for which said adjustable resistor exhibits maximum value of resistance.